US009330577B2

(12) United States Patent
Klein et al.

(10) Patent No.: US 9,330,577 B2
(45) Date of Patent: May 3, 2016

(54) INDIVIDUAL GUNNERY TRAINER WITH SENSING PLATFORM

(71) Applicant: Raydon Corporation, Port Orange, FL (US)

(72) Inventors: Donald Klein, Ormond Beach, FL (US); Angelo A. Moccia, Oak Hill, FL (US); Dale E. Walter, South Daytona, FL (US); Raymond Stemmle, III, Ormond Beach, FL (US)

(73) Assignee: Raydon Corporation, Port Orange, FL (US)

( * ) Notice: Subject to any disclaimer, the term of this patent is extended or adjusted under 35 U.S.C. 154(b) by 114 days.

(21) Appl. No.: 13/801,452

(22) Filed: Mar. 13, 2013

(65) Prior Publication Data

US 2014/0272805 A1 Sep. 18, 2014

(51) Int. Cl.
*G09B 19/00* (2006.01)
*G09B 9/00* (2006.01)
*G09B 9/30* (2006.01)

(52) U.S. Cl.
CPC .............. *G09B 19/00* (2013.01); *G09B 9/003* (2013.01); *G09B 9/307* (2013.01)

(58) Field of Classification Search
CPC .......... G09B 9/00; G09B 9/003; G09B 9/006; G09B 9/02; G09B 9/06; G09B 9/08; G09B 9/52; G09B 9/307; F41A 33/00; F41A 33/02; F41A 33/04; F41A 33/06; F41G 3/26; F41G 3/2605; F41G 3/2611; F41G 3/2616; F41G 3/2622; F41G 3/2694; F41G 3/28; F41G 3/30; F41J 9/14; F41J 5/00; F41J 5/02; F41J 5/04

USPC ...................................................... 434/11–72
See application file for complete search history.

(56) References Cited

U.S. PATENT DOCUMENTS

| 4,805,121 A  * | 2/1989  | Scott et al. .................... 345/421 |
| 6,604,064 B1 * | 8/2003  | Wolff et al. ....................... 703/7 |
| 2003/0091966 A1 | 5/2003  | Collodi |
| 2007/0072662 A1* | 3/2007 | Templeman ..................... 463/6 |
| 2007/0287133 A1 | 12/2007 | Schubert et al. |
| 2013/0004920 A1 | 1/2013  | Pabst et al. |

OTHER PUBLICATIONS

International Search Report and Written Opinion of the International Searching Authority for International Application No. PCT/US2014/023687, European Patent Office, Netherlands, mailed Jul. 21, 2014, 8 pages.

* cited by examiner

*Primary Examiner* — Timothy A Musselman
(74) *Attorney, Agent, or Firm* — Miles & Stockbridge P.C.

(57) ABSTRACT

A system and method are that includes a frame and a weapon mount on the frame that receives a weapon mock-up. The system also includes a substantially non-rotatable sensing platform, coupled to the frame, on which a single trainee stands, where rotational pressure applied to the platform by the trainee generates a virtual orientation signal. The system also includes a head-mounted display worn by the trainee that receives a display signal representative of a virtual environment to be simulated to the trainee; and a controller in electrical communication with the sensing platform and the display, wherein the controller receives the virtual orientation signal and generates the display signal in response such that rotational pressure applied to the platform by the trainee results in rotation of the virtual environment displayed to the trainee. A method for the simulation of a single weapon system in a transportable enclosure is also presented.

20 Claims, 12 Drawing Sheets

VEHICLE MOUNTED WEAPON TURRET - CURRENT TECHNOLOGY

VEHICLE MOUNTED WEAPON TURRET – VIEW FROM INSIDE VEHICLE

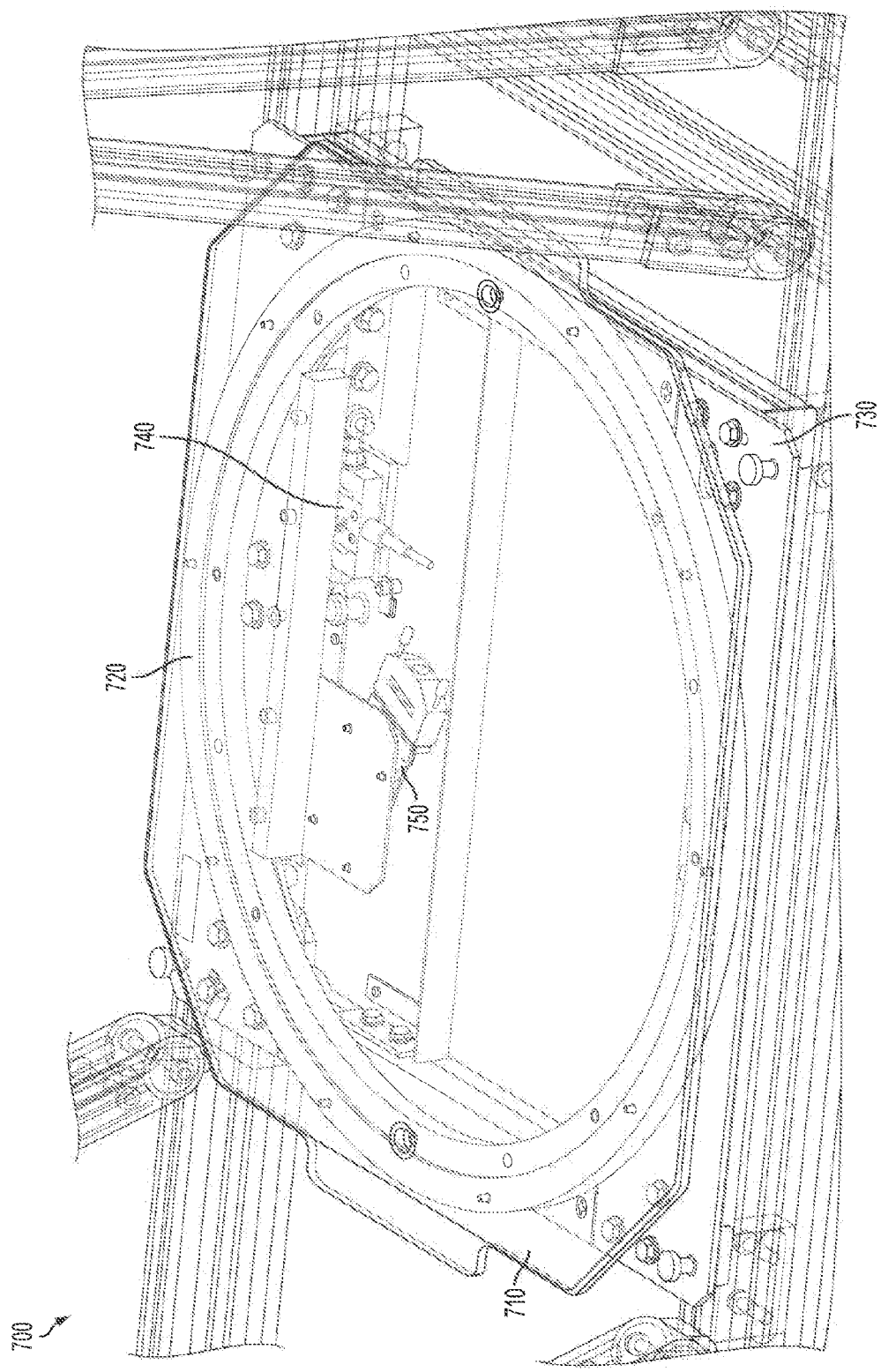

INDIVIDUAL GUNNERY TRAINER WITH SENSING PLATFORM

BACKGROUND OF THE INVENTION

1. Field

This invention relates to a simulation system for training individuals on the usage of an unstabilized weapon.

2. Background

As understood in this document, a simulation system is a physical structure in which real people and/or real objects may move, change location, possibly interact with each other, and possibly interact with simulated people and/or simulated objects (whose presence may be enacted via visual projections, audio emissions, or other means) typically in order to train for, prepare for, experience, analyze, or study real-life, potentially real-life, historical, or hypothetical situations, activities, or events. Simulations may be conducted for other purposes as well, such as educational or entertainment purposes, or for analyzing and refining the design and performance of mechanical technologies (such as cars or other transportation vehicles, weapons systems, etc.). The simulation as a whole may also be understood to include any technology which may be necessary or desirable to implement a simulation environment or simulation experience.

Realistic simulations of events play a key role in many fields of human endeavor, from the training of police, rescue, military, and emergency personnel; to the development of improved field technologies for use by such personnel; to the analysis of human movement and behavior in such fields as athletics and safety research. Increasingly, modern simulation environments strive for a dynamic, adaptive realism, meaning that the simulation environment can both provide feedback to individuals in the environment and can modify the course of the simulation itself in response to events within the simulation environment.

Simulation training has typically been restricted to fixed locations in which permanent or semi-permanent structures are constructed to contain the necessary computers and equipment required to present a simulated environment. The lack of mobility of such a simulation system therefore limits accessibility by individuals who need to be trained.

Further, a simulation environment should mimic the actual environment as closely as possible. However, presenting an accurate environment, especially given some of the current complexity and mechanical make-up of current weapon systems, is becoming increasingly difficult. For example, a gun, such as a .50 caliber M2, on an armored Humvee is mounted to an operator controlled rotating turret on the top of the vehicle. The difficulty in realistically simulating such an environment is that such a simulation typically involves large, heavy, mechanical mock-ups that do not lend themselves to being portable. Thus, there is a trade-off between presenting a realistic simulation and the transportability of such a simulation system.

BRIEF SUMMARY

Given the foregoing, what is needed is a method and system for providing a weapon simulation system that is both realistic and transportable. Further, the simulation system must be capable of realistically simulating, for example, a weapon system that involves a turret mount, with the ability for the individual to control the rotational orientation of the turret, while still being easily transportable.

In an embodiment of the present disclosure, a computer-based modular, transportable single weapon simulation system is presented. The system includes a frame and a weapon mount on the frame that receives a weapon mock-up. The system also includes a substantially non-rotatable sensing platform, coupled to the frame, on which a single trainee stands, where rotational pressure applied to the platform by the trainee generates a virtual orientation signal. The system also includes a head-mounted display worn by the trainee and that receives a display signal representative of a virtual environment to be simulated to the trainee; and a controller in electrical communication with the sensing platform and the display, wherein the controller receives the virtual orientation signal and generates the display signal in response such that rotational pressure applied to the platform by the trainee results in rotation of the virtual environment displayed to the trainee.

According to another embodiment, there is provided a method of simulation training for an individual gunner. The method includes simulating, in a frame assembly, the usage of a single unstabilized weapon system. The method includes presenting to a trainee, a virtual environment in the frame assembly where the individual stands on a substantially non-rotatable sensing platform. The method continues by generating a virtual orientation signal as a result of the applied rotational force and sends the virtual orientation signal to a controller, which generates a display signal in response to the virtual orientation signal such that rotational pressure applied to the platform by the trainee results in a rotation of the virtual environment displayed to the trainee in a head-mounted display unit worn by the trainee.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the relevant art(s) to make and use the present invention.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which are the same in structure, operation, or form but may be identified as being in different locations in space or recurring at different points in time (e.g., reference numbers '110a' and '110b' may indicate two different energy detection devices which are functionally the same, but are located at different points in a simulation arena).

FIG. 7 depicts a detailed view of a sensing platform of an individual gunnery simulation system, according to an embodiment of the present disclosure.

Further embodiments, features, and advantages of the present invention, as well as the operation of the various embodiments of the present invention, are described below with reference to the accompanying figures.

DETAILED DESCRIPTION OF THE INVENTION

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

As used herein, the term "gunnery" refers to operation by a trainee (i.e., a human) of a weapon mounted on a rotatable turret of a vehicle, vessel or airframe (e.g., a car, truck, boat, ship, fixed-wing aircraft, rotary-wing aircraft, etc.). The term "gunner" refers to such a trainee. The term "weapon" refers to any gun or rifle; grenade or rocket launcher; water cannon; acoustic, light or laser weapon; or other weapon that can be mounted on a rotatable turret and for which operational training is desired. A "weapon mock-up" is a proxy weapon for use in a simulation. A "weapon mock-up" may be structurally identical (or similar) and/or functionally identical (or similar) to the actual weapon for which training/simulation is desired.

A gunnery simulation system must present an accurate environment to a trainee. This includes visual, auditory, and tactile presentation and feedback, for example. Therefore, a gunnery simulation system needs to include a realistic weapon, e.g., when simulating an MK19 grenade launcher, the mock up weapon must look, feel, and virtually perform like an actual MK19 grenade launcher. Further, when simulating a single weapon system, e.g., an MK19, that is mounted in a turret, then the system must not only realistically simulate the performance of the MK19, but must also simulate the usage of an MK19 in a turret with the ability to manipulate the weapon while also manipulating the orientation of the turret.

Figure 1:
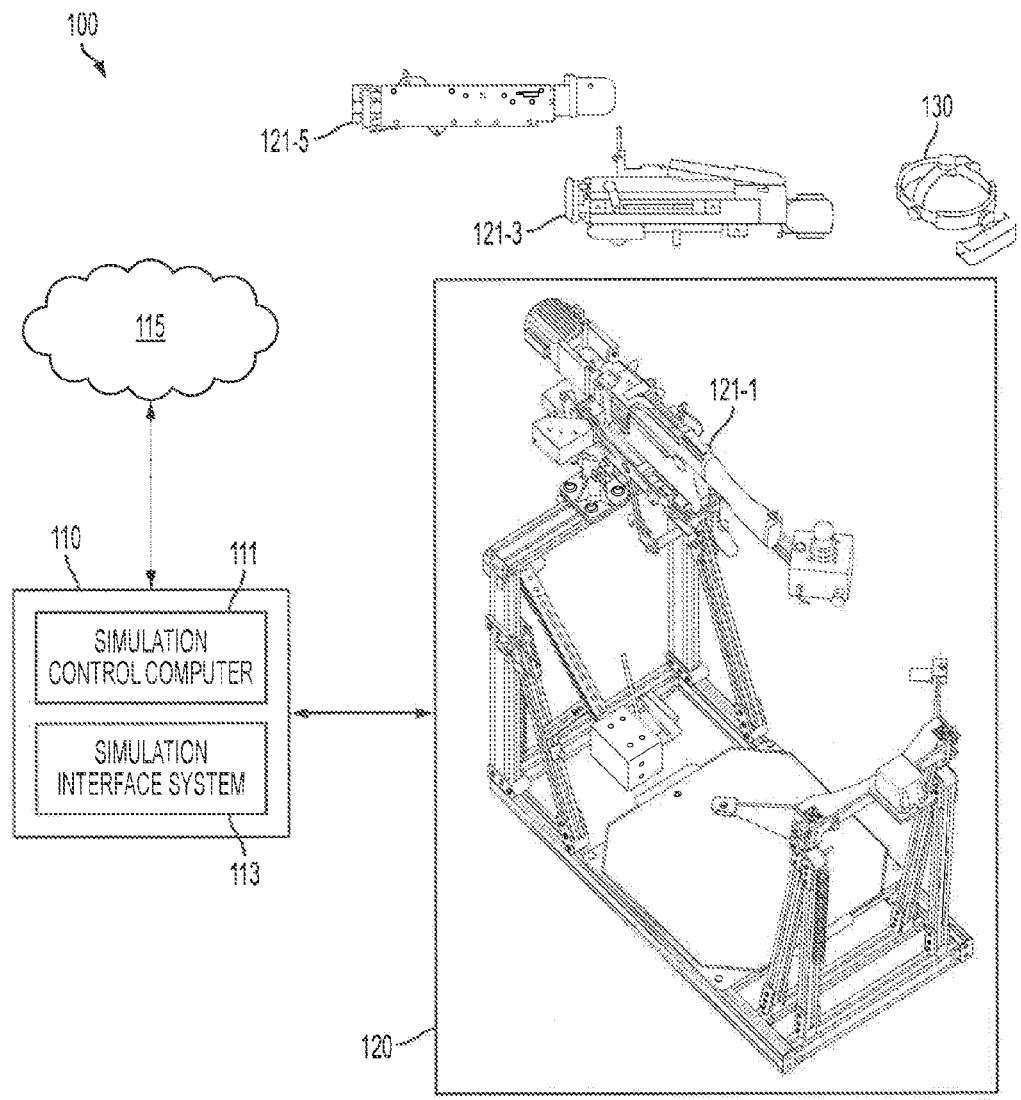
FIG. 1 illustrates a portable individual gunnery simulation system, according to an embodiment of the present disclosure.

FIG. 1 illustrates a transportable individual gunnery simulation system 100, according to an embodiment. Simulation system 100 includes a system controller 110, a communications network 115, a transportable weapon platform 120, and a head mounted display 130. System controller 110 includes a simulation control computer 111 and a simulation interface system 113. Transportable weapon platform 120 includes a weapon mock-up 121-1, e.g., an M2408 machine gun. Transportable weapon platform 120 can accommodate any number of alternate weapon mock-ups, such as weapon mock-ups 121-3 and 121-5, e.g., an MK19 grenade launcher or a .50 caliber rifle.

In an embodiment, communication network(s) 115 may be any type of data network or combination of data networks including, but not limited to, a local area network (LAN), a medium area network, or a wide area network such as the Internet. Communication network 115, for example, may be a wired or wireless network that allows system controller 110 to communicate with other simulation systems (not shown), servers, data bases, data collections systems, etc. Communication network 115 can further support world-wide-web (e.g., Internet) protocols and services.

Figure 10:
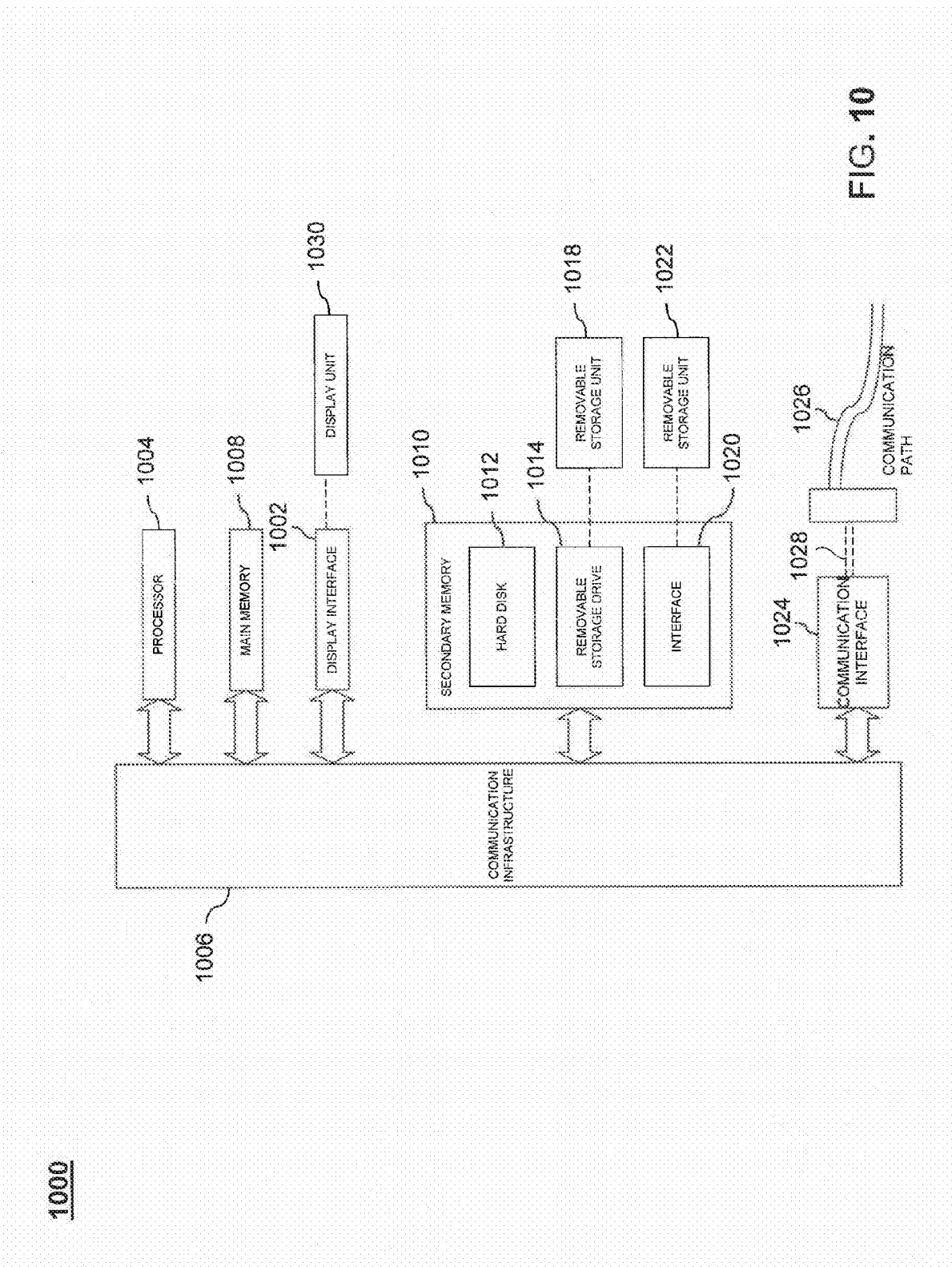
FIG. 10 is a diagram illustrating an exemplary computing system in which embodiments can be implemented.

System controller 110 may be implemented on a computing device. Such a computing device can include, but is not limited to, a personal computer, tablet, workstation, embedded system, or any other computing device that can support interne access and data input. Such a computing device may include, but is not limited to, a device having a processor and memory for executing and storing instructions. Such a computing device may include software, firmware, and hardware. The computing device may also have multiple processors and multiple shared or separate memory components. Software may include one or more applications, such as a simulation application and an operating system. Hardware can include, but is not limited to, a processor, memory, and graphical user interface display. An optional input device, such as a mouse or touch screen, may be used. In an embodiment, system controller 110 may be a computing device as shown in FIG. 10 below.

Individual gunnery simulation system 100 can operate as a stand-alone single weapon simulation system or it can be connected, for example via communication network 115, with other simulation systems where individual gunnery simulation system 100 is just one of many entities in a virtual simulation. System controller 110 contains simulation control computer 111 that controls the virtual environment presented to a trainee using weapon platform 120. Simulation interface system 113 contains the interconnect mechanisms to connect weapon platform 120 to simulation control computer 111. Such interconnections can include electrical and mechanical components that allow for the transfer of data and/or power between system controller 110 and weapon platform 120. Simulation interface system 113 can also connect to head mounted display 130 that the trainee is using during simulation training in weapon platform 120 where simulation control computer 111 presents a visual environment to the trainee based on the orientation of the trainee and that of weapon mock-up 121.

Figure 2:
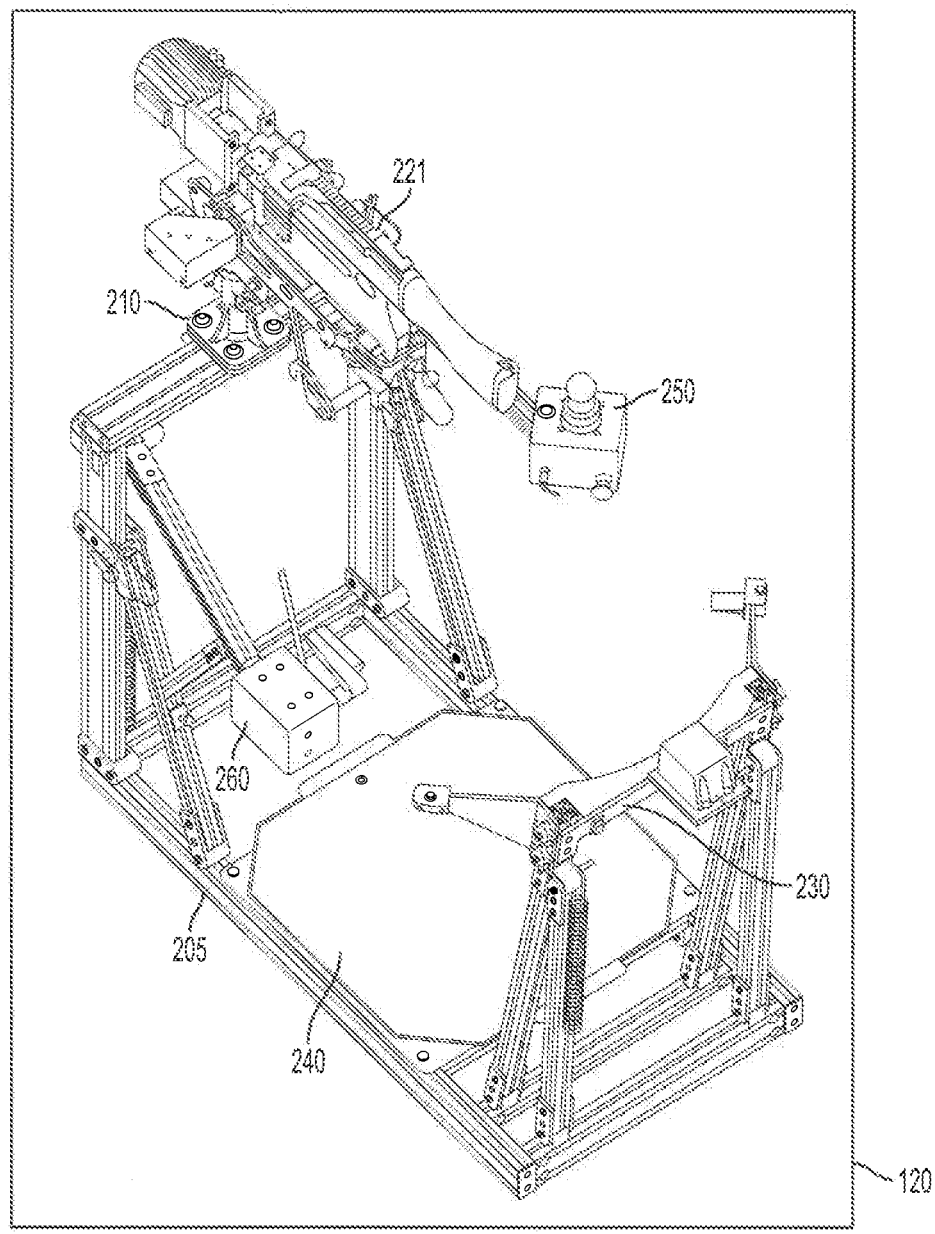
FIG. 2 depicts a single individual self-contained physical structure in a transportable gunnery simulation system, according to an embodiment of the present disclosure.

FIG. 2 depicts a more detailed view of weapon platform 120, according to an embodiment. Weapon platform 120 includes a platform frame 205, a weapon mount 210 (pintle and cradle), a weapon mock-up 221, a backrest support 230, a sensing platform 240, a power traverse unit 250, and a manual traverse unit 260.

Figure 3:
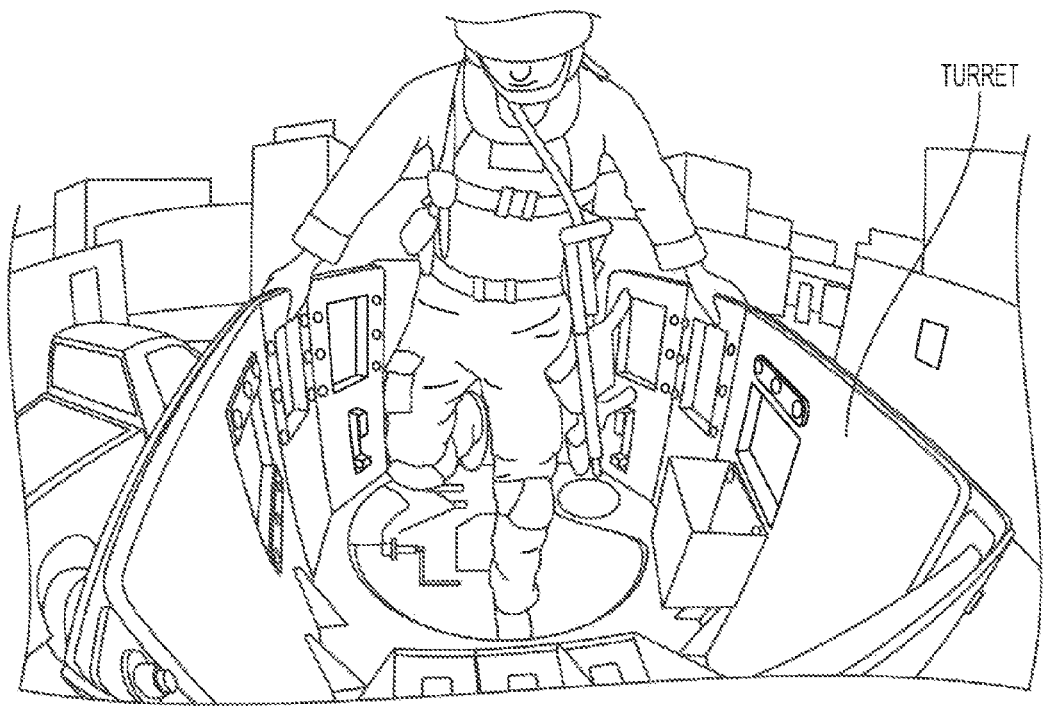
FIG. 3 depicts a vehicle mounted weapon turret for illustrative purposes.

In an embodiment, weapon platform 120 is a modular, self-contained physical structure that provides a position for a trainee in the simulation of a single weapon system where that weapon is mounted in a rotatable turret, e.g., in a vehicle, for example, as shown in FIG. 3.

A trainee stands on sensing platform 240 and has the ability to evaluate his surroundings, using head mounted display 130, to look left, right, forward, behind, up and down, and to look over, under, and around the weapon. A six degree of freedom head tracker tracks the position of the trainee's head where the orientation of the trainee's head is used to position the trainee's virtual field of view in head mounted display 130 to correspond to the roll, pitch, yaw and position of the trainee's head.

Weapon mock-up 221 can be any type of simulated weapon and is removable from weapon mount 210. Upon setup when weapon mock-up 221 is attached to weapon mount 210, the weapon type of weapon mock-up 221 is automatically detected through simulation interface system 113. The weapon type information is then relayed to simulation control computer 111 that controls the corresponding virtual environment presented to the trainee.

The trainee has the ability to aim and fire weapon mock-up 221 by traversing, elevating, and pressing a trigger on weapon mock-up 221. The trainee can also point and fire weapon mock-up 221 in the trainee's virtual field of view. Sensors located on weapon mount 210 are fed through simulation interface system 113 to simulation control computer 111 where the corresponding view is displayed in the trainee's head mounted display 130. The trainee also has the ability to perform any necessary steps to operate weapon mock-up 221, such as the loading, charging, and clearing of weapon mock-up 221.

A gunner in a real vehicle with a gun turret can traverse the turret by using a power joystick, a manual crank handle, or by placing his body against the backrest of the turret and twisting his body to physically rotate the turret. Weapon platform 120 simulates these same three types of movement and control.

Figure 4:
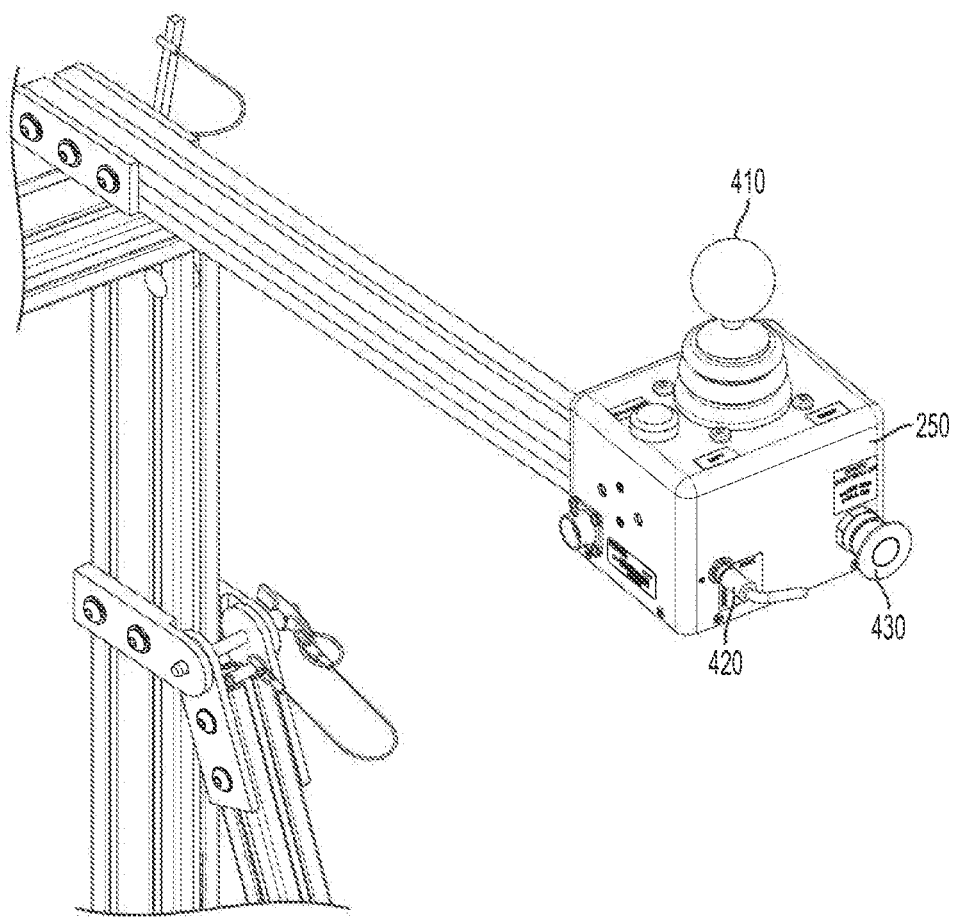
FIG. 4 depicts an alternate input device used to control the rotation of a virtual environment being presented to the individual gunner, according to an embodiment of the present disclosure.

For example, FIG. 4 depicts a detailed view of power traverse unit 250, according to an embodiment. In an embodiment, power traverse unit 250 includes a joystick 410, a gear engage lever 420, and a power switch 430. In an embodiment, a trainee can traverse the virtual turret by moving joystick 410 left or right. To enable power traverse unit 250, the trainee must first rotate gear engage lever 420 and press power switch 430. When enabled, the trainee's moving of joystick 410 left or right will result in the virtual turret in the trainee's head mounted display 130 rotating in a corresponding counter clockwise or clockwise direction. The speed at which the virtual turret in head mounted display 130 rotates is determined by joystick 410's position, e.g., the further from center joystick 410 is moved, the faster the rotation of the virtual turret. In an embodiment, a Hall Effect sensor, not shown, senses movement off center of joystick 410. Output from power traverse unit 250 is coupled to simulation interface system 113 and simulation control computer 111 that generates corresponding views in the trainee's head mounted display 130. The output signal from power traverse unit 250 can be an analog or digital signal. If the output signal is digital, it can be, for example, in the form of an Ethernet packet that is sent to simulation control computer 111, or to another control computer through communication network 115.

Figure 5:
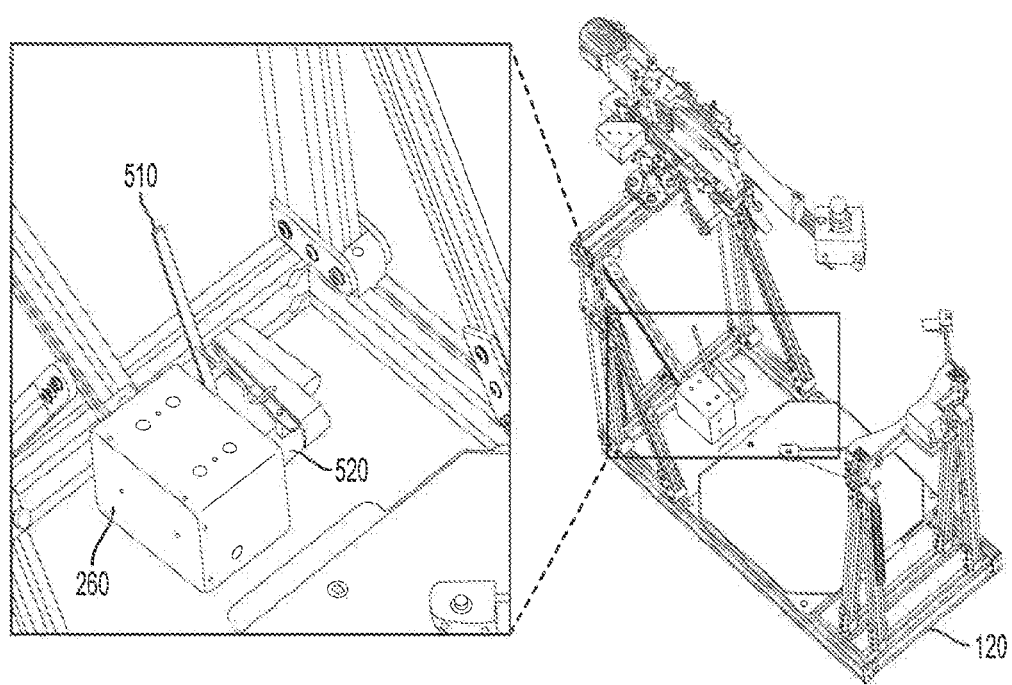
FIG. 5 depicts another alternate input device used to control the rotation of a virtual environment being presented to the individual gunner, according to an embodiment of the present disclosure.

FIG. 5 depicts a detailed view of manual traverse unit 260, according to an embodiment. In an embodiment, manual traverse unit 260 includes a gear engage lever 510 and a manual traverse crank handle 520. In an embodiment, a trainee can traverse (e.g., rotate) the virtual turret by rotating manual traverse crank handle 520. To enable manual traverse unit 260, the trainee must first engage gear engage lever 510. When engaged, the trainee's rotating of manual traverse crank handle 520 will result in rotation of the virtual turret in the trainee's head mounted display 130. By rotating manual traverse crank handle 520 clockwise, the virtual turret in head mounted display 130 will be rotated in a counter clockwise direction. The speed at which the virtual turret in head mounted display 130 rotates is determined by the speed at which manual traverse crank handle 520 is rotated. In an embodiment, an encoder sensor, not shown, in manual traverse unit 260 senses the rotation of manual traverse crank handles 520. Output from manual traverse unit 260 is coupled to simulation interface system 113 and simulation control computer 111 that generates corresponding views in the trainee's head mounted display 130. The output signal from manual traverse unit 260 can be an analog or digital signal. If the output signal is digital, in can be, for example, in the form of an Ethernet packet that is sent to simulation control computer 111 or to another control computer through communication network 115.

Figure 6:
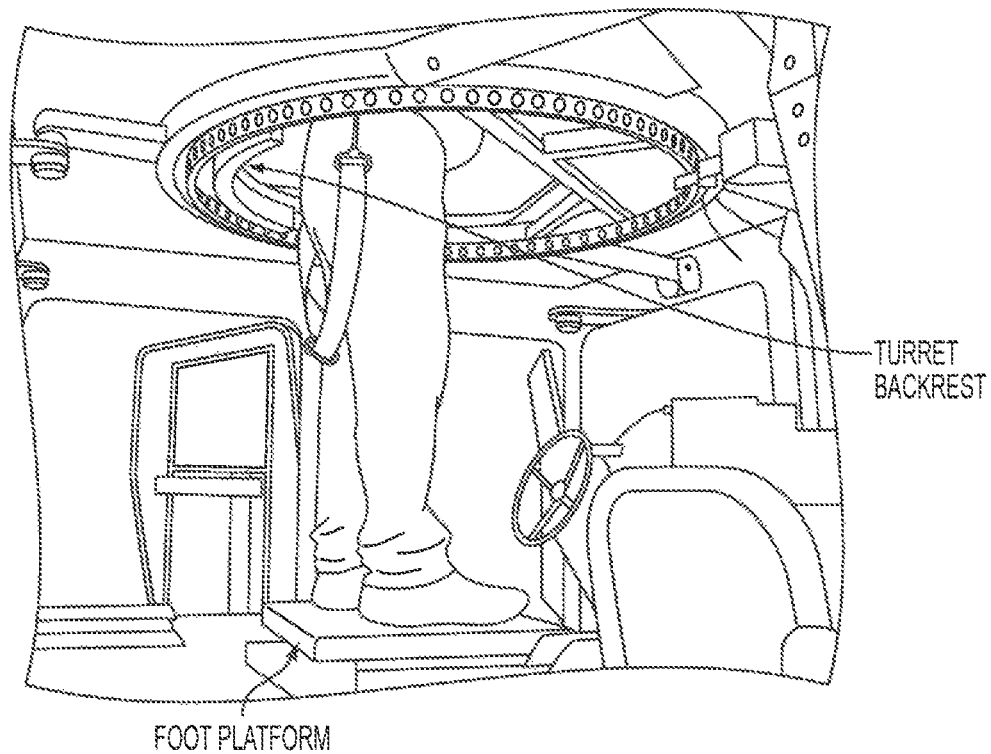
FIG. 6 depicts an alternate view of a vehicle mounted weapon turret for illustrative purposes.

The third method of rotating the virtual turret is by the use of a twisting motion of the trainee's body. In a real vehicle, a gunner has the ability to traverse the turret by twisting his body. The gunner's feet are positioned on a stationary platform with his back resting on the backrest of the turret. When the gunner twists his body, the pressure from his back to the turret backrest causes the turret to rotate. To continue rotating the turret the gunner will shuffle his feet as the turret rotates. This system is shown for illustrative purposes in FIG. 6.

To simulate rotating a turret using a trainee's twisting body motion, reference is made back to FIG. 2. A trainee stands on sensing platform 240 with the trainee's back resting on backrest support 230. The trainee then twists his body thereby applying a rotational force through his feet to the sensing platform. The rotational force on the sensing platform is detected and results in a rotation of the virtual scene in the trainee's head mounted display unit 130. The direction and speed at which the virtual scene rotates is determined by the amount and direction of the rotational force the trainee applies to sensing platform 240. To continue rotating the virtual scene the trainee maintains the rotational force on the sensing platform. To reverse the direction of rotation of the virtual scene the trainee simply reverses the direction of twisting motion. In an embodiment, a strain gage, e.g., load cell, in sensing platform 240 measures the direction, e.g., compress or decompress, and the amount of force being applied about the center axis of sensing platform 240. As with the manual and power traverse units, the sensing platform 240 is coupled to simulation interface system 113 and simulation control computer 111 that generates corresponding views in the trainee's head mounted display 130.

FIG. 7 depicts a detailed view of sensing platform system 700, according to an embodiment. Sensing platform 700 includes foot platform deck 710 (shown in phantom to illustrate the components thereunder), bearings 720, foot platform base 730, strain gage 740, and signal conditioner 750. Foot platform deck 710 is attached to foot platform base 730 through bearings 720. As foot platform deck 710 rotates through a minimal angular displacement, strain gage 740 is either compressed or extended, based on the direction of the rotational force. In one embodiment, platform deck 710 is permitted to rotate no more than about five degrees, and preferably no more than about one degree. The term "substantially non-rotatable" refers to rotation through no more than a small angle, such as about five degrees and, preferably, not more than about one degree. The higher the exerted rotational force the more the strain age is either compressed or extended. As strain gage 740 is extended or compressed, the electrical properties of strain gage 740 are altered. Signal conditioner 750 senses these electrical changes and generates a digital signal. In an embodiment, when the rotational force to foot platform 730 exceeds a certain threshold, e.g., 100 pounds clockwise or counter-clockwise, the signal is treated as calling for a maximum amount of rotation of the virtual scene sent to head mounted display 130. When foot platform deck 710 is in an idle or resting position, similar to that of a joystick's center position, then there is no rotation of the virtual scene.

Figure 8A:
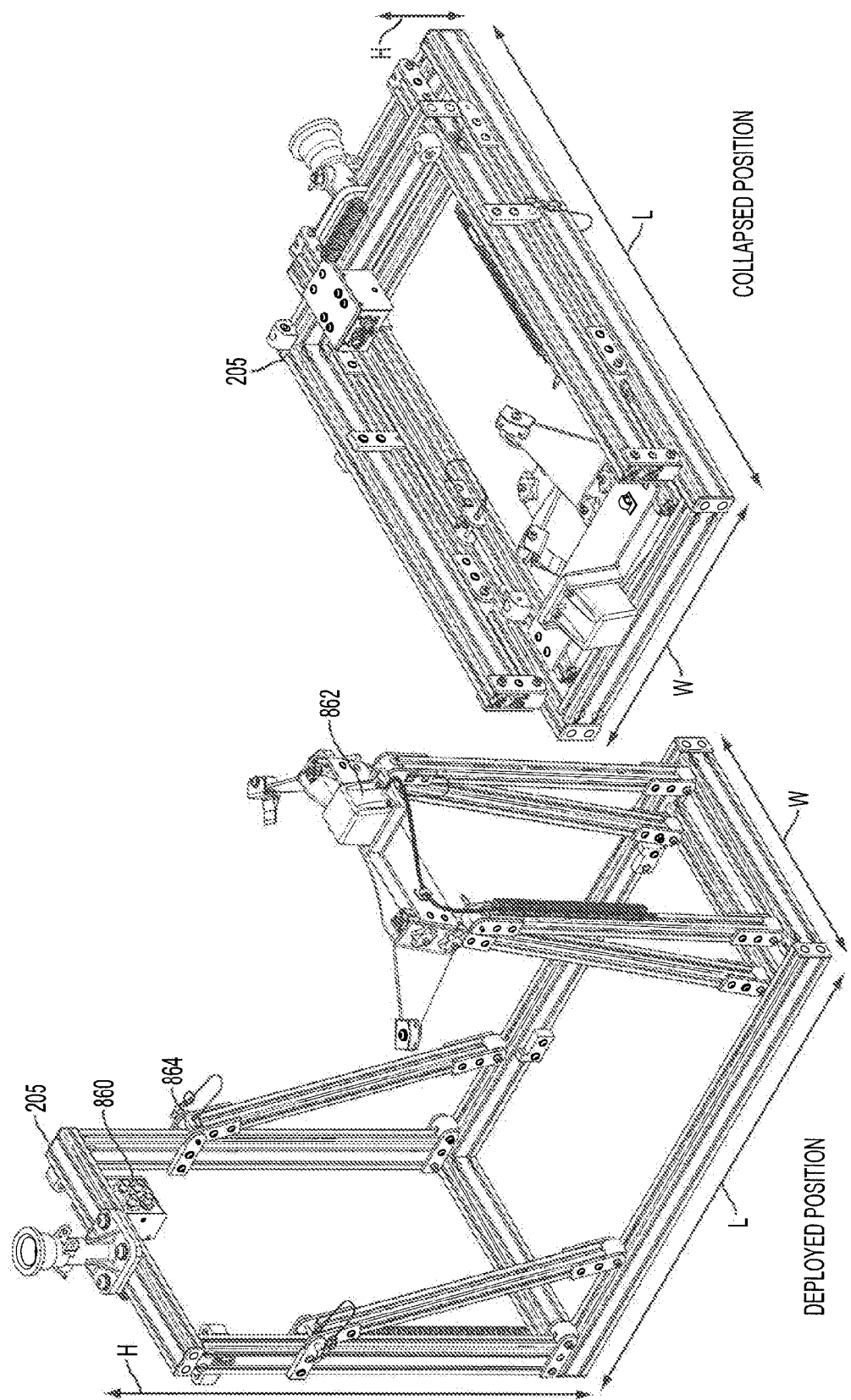
FIGS. 8A, 8B and 8C illustrate the physical structure of FIG. 2 in a deployed and collapsed position (FIG. 8A), and within a carrying case (FIGS. 8B and 8C), and according to an embodiment of the present disclosure.
Figure 8B:
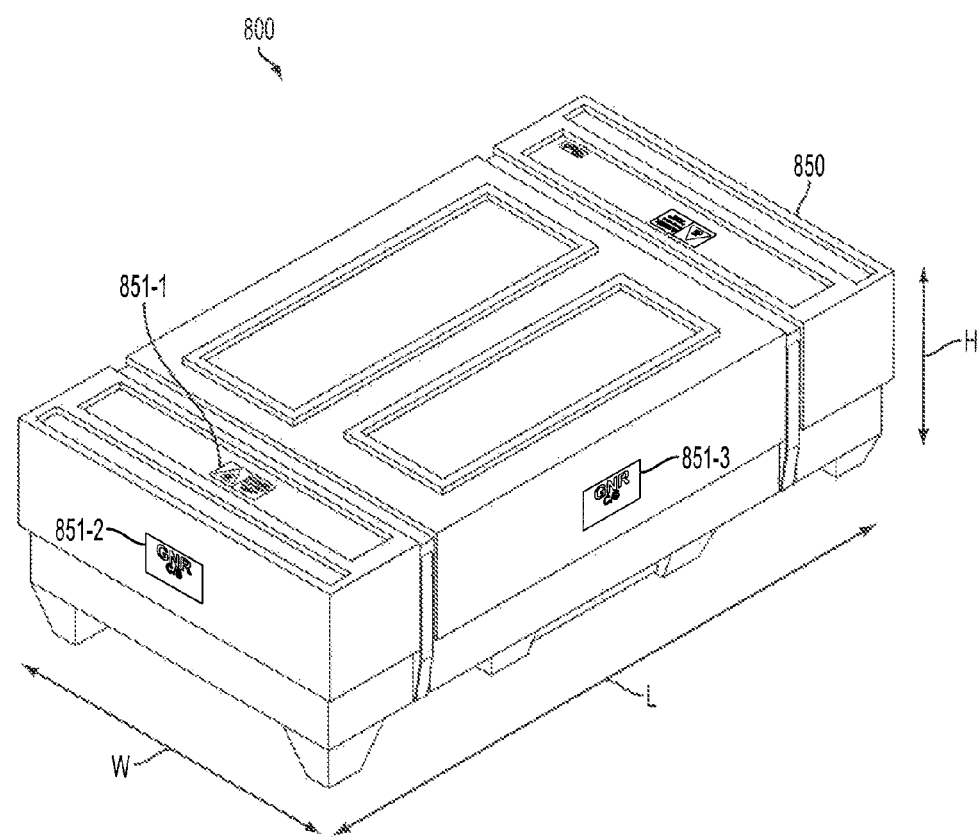
Figure 8C:
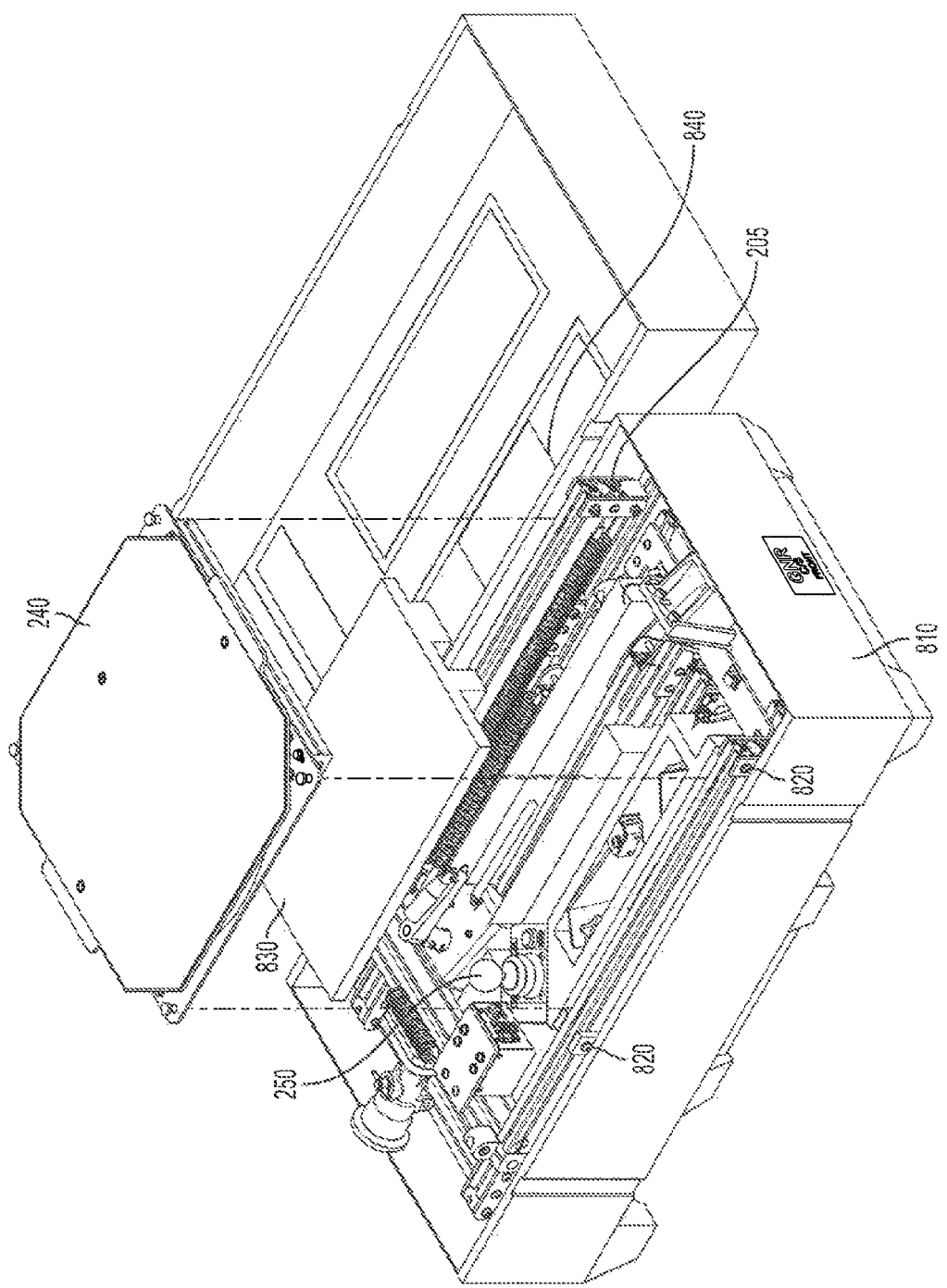

FIGS. 8A, 8B, and 8C illustrate the modular and transportable aspects of transportable weapon platform 120, according to an embodiment. For example, FIG. 8A illustrates weapon platform frame 205 in a deployed position and a collapsed position. Transportable weapon platform 120 is designed in a modular fashion whereby accessory components, such as weapon mock-up 221, sensing platform 240, power traverse unit 250, and manual traverse unit 260 simply attach to weapon platform frame 205. In an embodiment, such attachment of accessories can be done without any tools. Such a design allows transportable weapon platform 120 to arrive at a training site, for example, and within a short time, for example, under an hour, be unpacked, unfolded, and set up with a choice of weapon mock-ups.

In an embodiment, weapon platform frame 205, as shown on the left side of FIG. 8A, in a deployed position measures approximately 48 inches high (H), 24 inches wide (W), and 48 inches long (L) and weighs approximately 112 pounds. Weapon platform frame 205, as shown on the right side of FIG. 8A, in a collapsed position measures approximately 10 inches high (h), 24 inches wide (w), and 48 inches long (l). In an embodiment, weapon platform frame 205 is constructed of rigid, light weight metal, e.g., aluminum. The various sections of weapon platform frame 205 as shown in FIG. 8A are held in position with the use of pins, e.g., pin 864. Further, in an embodiment, weapon platform frame 205 can include the use of radio unit 860. Also shown is head tracking unit 862, which in conjunction with head mounted display 130 tracks the position of a trainee's head whereby positional information can be sent to system controller 110.

Once collapsed the entire system can be stored into a system case 800, as shown in FIG. 8B, according to an embodiment. System case 800 is shown with identification labels 851-1, -2 and -3, and also includes a handle 850 (hidden from view) for ease of transport. System case 800 measures approximately 10 inches high (H), 24 inches wide (W), and 48 inches long (L), and weighs approximately 200 pounds, which includes the attached controls, e.g., power traverse unit 250, and manual traverse unit 260, and sensing platform 240. Such a weight and size allows the simulation system to be easily transported to any training site with minimal effort.

FIG. 8C shows how weapon platform frame 205, sensing platform 240, and other accessories, such as power traverse unit 250, are contained within system case 800 allowing for simple storage and transportation of the system.

Methods

Figure 9:
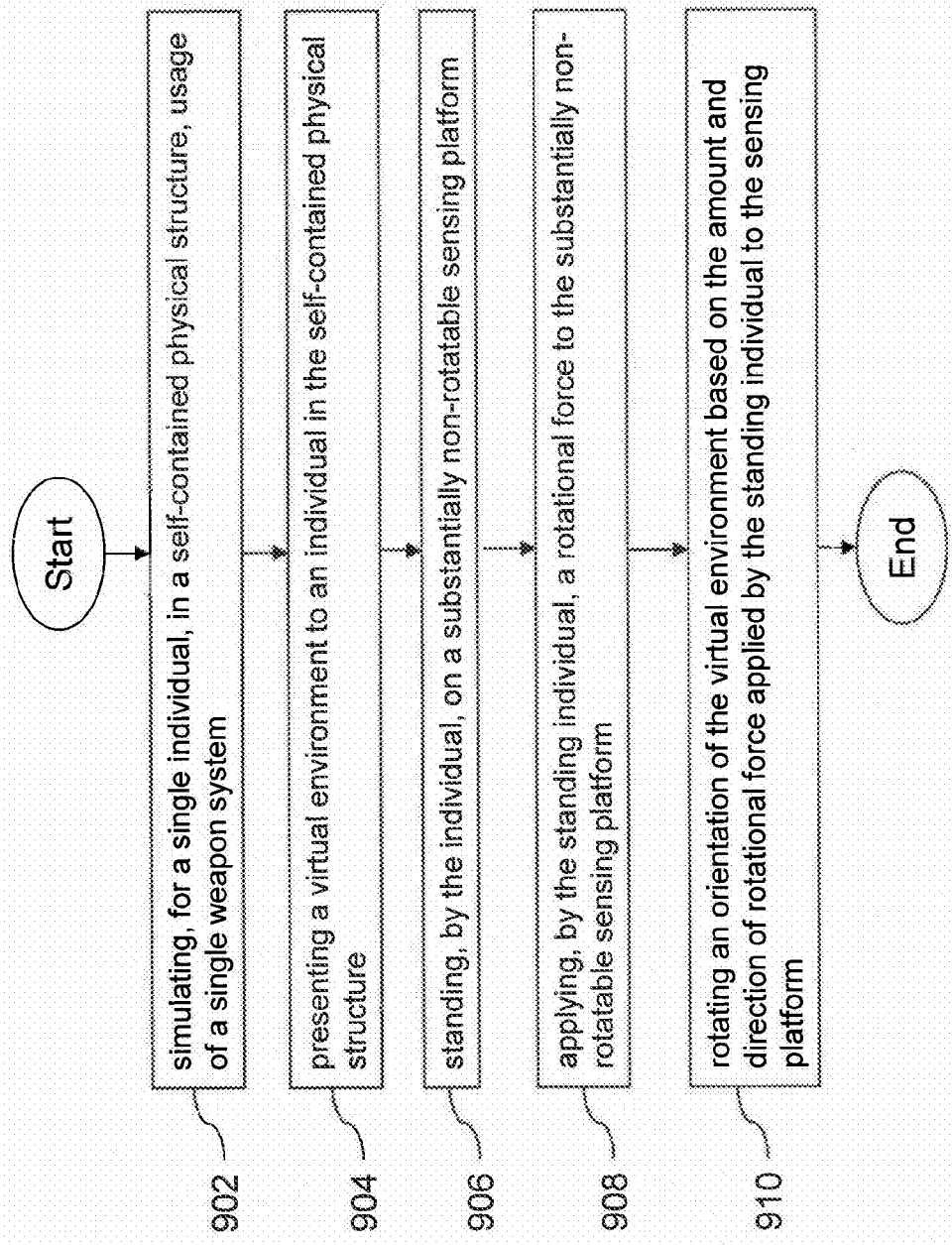
FIG. 9 illustrates a flow chart of a method for simulation training for an individual gunner, according to an embodiment of the present disclosure.

FIG. 9 shows an exemplary embodiment of a method 900 for simulation training of an individual gunner. Method 900 begins at step 902 with simulating, for a trainee, in a self-contained physical structure, usage of a single weapon system. For example, FIG. 1 illustrates a transportable individual gunnery simulation system 100 that includes a system controller 110, a simulation control computer 111, a simulation interface system 113, a communications network 115, a transportable weapon platform 120, and a head mounted display 130. Transportable weapon platform 120, in which the single individual stands, is a self-contained physical structure that has the ability to simulate a variety of single weapon systems, such as a .50 caliber rifle or an M240B machine gun. The self-contained physical structure is also illustrated in FIGS. 8A and 8B that show that transportable weapon platform 120 collapses into a single transportable container.

Method 900 continues to step 904 with the presenting of a virtual environment to an individual in the self-contained physical structure. In an exemplary embodiment, this presenting of a virtual environment is depicted in FIGS. 1 and 2. The individual, a trainee, stands inside transportable weapon platform 120 and wears head mounted display 130. Based on the type of weapon mock-up used by the trainee, simulation control computer 111 reacts to the actions of the trainee using the weapon mock-up and presents a simulated virtual scene and environment to the trainee through head mounted display 130.

Method 900 continues with step 906, where the individual stands on a substantially non-rotatable sensing platform. In an exemplary embodiment, a trainee stands on sensing platform 240 with the trainee's back resting on backrest support 230. Further details on the substantially non-rotatable sensing platform are presented above with reference to FIG. 7.

Method 900 continues to step 908, where the individual standing on the substantially non-rotatable sensing platform applies a rotational force to the sensing platform. In an embodiment, as described above with reference to FIG. 2, a trainee stands on sensing platform 240 with the trainee's back resting on backrest support 230 and then twists his body thereby applying a rotational force through his feet to the sensing platform.

Method 900 continues with step 910, where an orientation of the presented virtual environment is rotated based on the amount and direction of applied rotational force from the standing individual to the sensing platform. In an embodiment, the rotational force on the sensing platform generated by the twisting motion of the trainee is detected and measured, resulting in a rotation of the virtual scene in the trainee's head mounted display unit 130. The direction and speed at which the virtual scene rotates is determined by the amount and direction of the rotational force the trainee applies to sensing platform 240. To continue rotating the virtual scene the trainee maintains the rotational force on the sensing platform. To reverse the direction of rotation of the virtual scene the trainee simply reverses the direction of twisting motion. Further, as described above with reference to FIG. 7, as foot platform deck 710 rotates through a minimal angular displacement, strain gage 740 is either compressed or extended, based on the direction of the rotational force. In one embodiment, platform deck 710 is permitted to rotate no more than about five degrees, and preferably no more than about one degree. The higher the exerted rotational force the more the strain age is either compressed or extended. As the strain gage is extended or compressed the electrical properties of strain gage 740 are altered. Signal conditioner 750 senses these electrical changes and generates a digital signal that is directed to simulation control computer 111 that controls the presentation of the virtual environment to the trainee through head mounted display 130.

Example Computer System Implementation

Aspects of the present invention shown in FIG. 1, or any part(s) or function(s) thereof, may be implemented using hardware, software modules, firmware, tangible computer readable media having instructions stored thereon, or a combination thereof and may be implemented in one or more computer systems or other processing systems.

FIG. 10 illustrates an example computer system 1000 in which embodiments, or portions thereof, may be implemented as computer-readable code. For example, portions of system controller 110 may be implemented in portions of computer system 700 using hardware, software, firmware, tangible computer readable media having instructions stored thereon, or a combination thereof and may be implemented in one or more computer systems or other processing systems. Hardware, software, or any combination of such may embody any of the modules and components in FIG. 1.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

Computer system 1000 (optionally) includes a display interface 1002 (which can include input and output devices such as keyboards, mice, etc.) that forwards graphics, text, and other data from communication infrastructure 1006 (or from a frame buffer not shown) for display on display unit 1030.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communication interface 1024. Communication interface 1024 allows software and data to be transferred between computer system 1000 and external devices. Communication interface 1024 may include a modem, a network interface (such as an Ethernet card), a communication port, a PCMCIA slot and card, or the like. Software and data transferred via communication interface 1024 may be in the form of signals, which may be electronic, electromagnetic, optical, or other signals capable of being received by communication interface 1024. These signals may be provided to communication interface 1024 via a communication path 1026. Communication path 1026 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communication interface 1024. Such computer programs, when executed, enable computer system 1000 to implement the present invention as discussed herein. In particular, the computer programs, when executed, enable processor device 1004 to implement the processes of the present invention, such as the stages in the method illustrated by flowchart 900 of FIG. 9, as previously discussed. Accordingly, such computer programs represent controllers of the computer system 1000. Where the invention is implemented using software, the software may be stored in a computer program product and loaded into computer system 1000 using removable storage drive 1014, interface 1020, and hard disk drive 1012, or communication interface 1024.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer-based modular, transportable turret mounted gunnery simulation system comprising:
    a weapon mount on a frame configured to receive mounting thereon of a weapon mock-up;
    a substantially non-rotatable sensing platform coupled to the frame and configured to receive a single trainee standing thereon, wherein the sensing platform is configured to sense a rotational pressure applied to the platform by the trainee and generate a rotational orientation signal;
    a head-mounted display configured to be worn by the trainee and configured to receive a display signal representative of a virtual environment to be simulated to the trainee; and
    a controller in electrical communication with the sensing platform and the display, wherein the controller is configured to receive the rotational orientation signal and to generate the display signal in response thereto such that rotational pressure applied to the platform by the trainee results in rotation of the virtual environment displayed to the trainee.

2. The computer-based gunnery simulation system of claim 1, wherein the substantially non-rotatable sensing platform rotates less than one degree, but greater than zero degrees.

3. The computer-based gunnery simulation system of claim 1, wherein a speed of the rotation of the presented virtual environment is proportional to the rotational force presented by the individual to the sensing platform.

4. The computer-based gunnery simulation system of claim 3, wherein the speed of the rotation of the presented virtual environment is limited if the rotational force presented by the individual to the sensing platform exceeds a threshold value.

5. The computer-based gunnery simulation system of claim 1, wherein the rotation of the presented virtual environment is in a horizontal plane through an unrestricted angular displacement.

6. The computer-based gunnery simulation system of claim 1, further comprising a joystick based input/output device configured to control the rotation of the presented virtual environment while negating the rotational control of the sensing platform.

7. The computer-based gunnery simulation system of claim 1, further comprising an input/output device comprising a crank handle configured to control the rotation of the presented virtual environment while negating the rotational control of the sensing platform.

8. The computer-based gunnery simulation system of claim 1, wherein the transportable gunnery simulation system is collapsible such that it can be transported within a system case that measures approximately 10 inches high, 24 inches wide, and 48 inches long.

9. The computer-based gunnery simulation system of claim 1, wherein the rotational force applied to the sensing platform is measured using a strain gauge.

10. The computer-based gunnery simulation system of claim 1, further comprising a head-mounted display configured to provide a full spherical field of regard to the individual based on a head orientation of the individual and the rotation of the presented virtual environment based on input from the sensing platform.

11. A method of turret mounted weapon simulation training for an individual gunner, the method comprising:
    simulating, in a frame assembly, usage of a single unstabilized weapon system;
    presenting a virtual environment to a trainee in the frame assembly;
    standing, by a single trainee, on a substantially non-rotatable sensing platform;
    applying, by the single trainee, a rotational force to the substantially non-rotatable sensing platform;
    generating a rotational orientation signal as a result of the applied rotational force,
    sending the rotational orientation signal to a controller, and
    generating a display signal in response to the rotational orientation signal such that rotational pressure applied to the sensing platform by the trainee results in a rotation of the virtual environment displayed to the trainee in a head-mounted display unit worn by the trainee.

12. The method of claim 11, wherein the rotational force applied to the substantially non-rotatable sensing platform results in less than a one degree, but greater than zero degrees, amount of rotational movement of the sensing platform.

13. The method of claim 11, further comprising coupling a removable realistic weapon mock-up to the self-contained physical structure.

14. The method of claim 11, wherein the virtual environment presented to the trainee rotates in a clockwise direction when the trainee applies a counter-clockwise rotational force to the sensing platform, and
wherein the virtual environment presented to the trainee rotates in a counter-clockwise direction when the trainee applies a clockwise rotational force to the sensing platform.

15. The method of claim 11, wherein a speed of the rotation of the presented virtual environment is proportional to the rotational force presented to the sensing platform.

16. The method of claim 11, wherein the speed of the rotation of the presented virtual environment is limited to a maximum value if the rotation force presented by the individual to the sensing platform exceeds a threshold value.

17. The method of claim 11, wherein the rotation of the presented virtual environment is in a horizontal plane through an unrestricted angular displacement.

18. The method of claim 11, farther comprising controlling the rotation of the presented virtual environment using a joystick based input/output device while negating the rotational control of the sensing platform.

19. The method of claim 11, further comprising controlling the rotation of the presented virtual environment using an input/output device comprising a crank handle while negating the rotational control of the sensing platform.

20. The method of claim 11, further comprising presenting a full spherical field of regard to the individual based on a head orientation of the individual and the rotation of the presented virtual environment based on input from the sensing platform.

* * * * *